US007363368B2

(12) United States Patent
Paulin

(10) Patent No.: US 7,363,368 B2
(45) Date of Patent: Apr. 22, 2008

(54) SYSTEM AND METHOD FOR TRANSACTION RECORDING AND PLAYBACK

(75) Inventor: Jean Marc Paulin, Surrey (GB)

(73) Assignee: International Business Machines Corporation, Armonk, NY (US)

( * ) Notice: Subject to any disclaimer, the term of this patent is extended or adjusted under 35 U.S.C. 154(b) by 372 days.

(21) Appl. No.: 10/026,372

(22) Filed: Dec. 24, 2001

(65) Prior Publication Data

US 2003/0131008 A1 Jul. 10, 2003

(51) Int. Cl.
*G06F 11/30* (2006.01)

(52) U.S. Cl. .............. 709/224; 709/223; 709/203; 707/100

(58) Field of Classification Search ............ 707/10, 707/5, 100; 709/219, 203, 206, 224, 108
See application file for complete search history.

(56) References Cited

U.S. PATENT DOCUMENTS

| | | |
|---|---|---|
| 3,855,456 A | 12/1974 | Summers et al. |
| 3,906,454 A | 9/1975 | Martin |
| 4,135,662 A | 1/1979 | Dlugos |
| 4,410,950 A | 10/1983 | Toyoda et al. |
| 4,438,494 A | 3/1984 | Budde et al. |
| 4,503,534 A | 3/1985 | Budde et al. |
| 4,503,535 A | 3/1985 | Budde et al. |
| 4,517,468 A | 5/1985 | Kemper et al. |
| 4,545,013 A | 10/1985 | Lyon et al. |
| 4,568,909 A | 2/1986 | Whynacht |
| 4,585,975 A | 4/1986 | Wimmer |

(Continued)

FOREIGN PATENT DOCUMENTS

EP 0 209 795 1/1987

(Continued)

OTHER PUBLICATIONS

Subramanian, Mani, Network Management: Principles and Practice, Addison Wesley Longman, 2000.

(Continued)

*Primary Examiner*—Charles Rones
*Assistant Examiner*—Belix M Ortiz
(74) *Attorney, Agent, or Firm*—Seth H. Ostrow; Dreier LLP

(57) ABSTRACT

The system and method of the present invention comprises functionality to record the steps of a user's navigation transaction and to subsequently play back those steps to determine service availability and levels. The present invention comprises a method for recording a user's steps in a navigation transaction by retrieving an information resource and calculating service level thresholds and the time required to retrieve the information resource. The service level thresholds and parameters regarding the information resource is recorded in a transaction data file as a step comprising the navigation transaction. The present invention also comprises a method for playing back one or more steps executed by a user as part of a navigation transaction, the navigation transaction stored in a transaction data file. The method for playing back one or more steps executed by a user as part of a navigation transaction comprises identifying a first step within the transaction, executing the first step by attempting to retrieve an information resource identified by the step, and returning a level of service for a server hosting the information resource identified by the step.

12 Claims, 7 Drawing Sheets

U.S. PATENT DOCUMENTS

| | | | |
|---|---|---|---|
| 4,591,983 A | 5/1986 | Bennett et al. | |
| 4,622,545 A | 11/1986 | Atkinson | |
| 4,648,044 A | 3/1987 | Hardy et al. | |
| 4,727,545 A | 2/1988 | Glackemeyer et al. | |
| 4,817,092 A | 3/1989 | Denny | |
| 4,823,345 A | 4/1989 | Daniel et al. | |
| 4,866,712 A | 9/1989 | Chao | |
| 4,881,230 A | 11/1989 | Clark et al. | |
| 4,914,657 A | 4/1990 | Walter et al. | |
| 4,932,026 A | 6/1990 | Dev et al. | |
| 4,935,876 A | 6/1990 | Hanatsuka | |
| 5,107,497 A | 4/1992 | Lirov et al. | |
| 5,109,486 A | 4/1992 | Seymour | |
| 5,123,017 A | 6/1992 | Simpkins et al. | |
| 5,125,091 A | 6/1992 | Staas, Jr. et al. | |
| 5,133,075 A | 7/1992 | Risch | |
| 5,159,685 A | 10/1992 | Kung | |
| 5,179,556 A | 1/1993 | Turner | |
| 5,204,955 A | 4/1993 | Kagei et al. | |
| 5,214,653 A | 5/1993 | Elliott, Jr. et al. | |
| 5,247,517 A | 9/1993 | Ross et al. | |
| 5,261,044 A | 11/1993 | Dev et al. | |
| 5,293,629 A | 3/1994 | Conley et al. | |
| 5,295,244 A | 3/1994 | Dev et al. | |
| 5,309,448 A | 5/1994 | Bouloutas et al. | |
| 5,321,837 A | 6/1994 | Daniel et al. | |
| 5,375,070 A | 12/1994 | Hershey et al. | |
| 5,432,934 A | 7/1995 | Levin et al. | |
| 5,436,909 A | 7/1995 | Dev et al. | |
| 5,483,637 A | 1/1996 | Winokur et al. | |
| 5,485,455 A | 1/1996 | Dobbins et al. | |
| 5,491,694 A | 2/1996 | Oliver et al. | |
| 5,495,470 A | 2/1996 | Tyburski et al. | |
| 5,504,921 A | 4/1996 | Dev et al. | |
| 5,521,910 A | 5/1996 | Matthews | |
| 5,528,516 A | 6/1996 | Yemini et al. | |
| 5,559,955 A | 9/1996 | Dev et al. | |
| 5,590,120 A | 12/1996 | Vaishnavi et al. | |
| 5,627,819 A | 5/1997 | Dev et al. | |
| 5,649,103 A | 7/1997 | Datta et al. | |
| 5,666,481 A | 9/1997 | Lewis | |
| 5,675,741 A | 10/1997 | Aggarwal et al. | |
| 5,687,290 A | 11/1997 | Lewis | |
| 5,696,486 A | 12/1997 | Poliquin et al. | |
| 5,706,436 A | 1/1998 | Lewis et al. | |
| 5,722,427 A | 3/1998 | Wakil et al. | |
| 5,727,157 A | 3/1998 | Orr et al. | |
| 5,734,642 A | 3/1998 | Vaishnavi et al. | |
| 5,748,781 A | 5/1998 | Datta et al. | |
| 5,751,933 A | 5/1998 | Dev et al. | |
| 5,751,965 A | 5/1998 | Mayo et al. | |
| 5,754,532 A | 5/1998 | Dev et al. | |
| 5,764,955 A | 6/1998 | Doolan | |
| 5,768,501 A | 6/1998 | Lewis | |
| 5,777,549 A | 7/1998 | Arrowsmith et al. | |
| 5,790,546 A | 8/1998 | Dobbins et al. | |
| 5,791,694 A | 8/1998 | Fahl et al. | |
| 5,793,362 A | 8/1998 | Matthew et al. | |
| 5,812,750 A | 9/1998 | Dev et al. | |
| 5,822,305 A | 10/1998 | Vaishnavi et al. | |
| 5,832,503 A | 11/1998 | Malik et al. | |
| 5,872,928 A | 2/1999 | Lewis et al. | |
| 5,881,237 A | 3/1999 | Schwaller et al. | 395/200.54 |
| 5,889,953 A | 3/1999 | Thebaut et al. | |
| 5,907,696 A | 5/1999 | Stilwell et al. | |
| 5,913,041 A | 6/1999 | Ramanathan et al. | 395/200.63 |
| 5,937,165 A | 8/1999 | Schwaller et al. | 395/200.54 |
| 5,940,376 A | 8/1999 | Yanacek et al. | |
| 5,970,984 A | 10/1999 | Wakil et al. | |
| 5,980,984 A | 11/1999 | Modera et al. | |
| 5,987,442 A | 11/1999 | Lewis et al. | |
| 6,000,045 A | 12/1999 | Lewis | |
| 6,003,090 A | 12/1999 | Puranik et al. | |
| 6,014,697 A | 1/2000 | Lewis et al. | |
| 6,026,442 A | 2/2000 | Lewis et al. | |
| 6,041,383 A | 3/2000 | Jeffords et al. | |
| 6,044,398 A * | 3/2000 | Marullo et al. | 709/219 |
| 6,049,828 A | 4/2000 | Dev et al. | |
| 6,057,757 A | 5/2000 | Arrowsmith et al. | |
| 6,064,304 A | 5/2000 | Arrowsmith et al. | |
| 6,064,986 A | 5/2000 | Edelman | |
| 6,064,996 A | 5/2000 | Yamaguchi et al. | |
| 6,070,190 A * | 5/2000 | Reps et al. | 709/224 |
| 6,084,858 A | 7/2000 | Matthews et al. | |
| 6,115,362 A | 9/2000 | Bosa et al. | |
| 6,131,112 A | 10/2000 | Lewis et al. | |
| 6,138,122 A | 10/2000 | Smith et al. | |
| 6,141,699 A | 10/2000 | Luzzi et al. | 709/331 |
| 6,141,720 A | 10/2000 | Jeffords et al. | |
| 6,199,172 B1 | 3/2001 | Dube et al. | |
| 6,205,563 B1 | 3/2001 | Lewis | |
| 6,209,033 B1 | 3/2001 | Datta et al. | |
| 6,216,168 B1 | 4/2001 | Dev et al. | |
| 6,233,623 B1 | 5/2001 | Jeffords et al. | |
| 6,243,747 B1 | 6/2001 | Lewis et al. | |
| 6,255,943 B1 | 7/2001 | Lewis et al. | |
| 6,324,530 B1 | 11/2001 | Yamaguchi et al. | |
| 6,324,590 B1 | 11/2001 | Jeffords et al. | |
| 6,336,138 B1 | 1/2002 | Caswell et al. | |
| 6,349,306 B1 | 2/2002 | Malik et al. | |
| 6,373,383 B1 | 4/2002 | Arrowsmith et al. | |
| 6,374,293 B1 | 4/2002 | Dev et al. | |
| 6,381,639 B1 | 4/2002 | Thebaut et al. | |
| 6,392,667 B1 | 5/2002 | McKinnon et al. | |
| 6,421,719 B1 | 7/2002 | Lewis et al. | |
| 6,430,712 B2 | 8/2002 | Lewis | |
| 6,437,804 B1 | 8/2002 | Ibe et al. | |
| 6,442,585 B1 * | 8/2002 | Dean et al. | 718/108 |
| 6,502,079 B1 | 12/2002 | Ball et al. | |
| 6,510,478 B1 | 1/2003 | Jeffords et al. | |
| 6,603,396 B2 | 8/2003 | Lewis et al. | |
| 6,651,062 B2 | 11/2003 | Ghannam et al. | |
| 2001/0013107 A1 | 8/2001 | Lewis | |
| 2001/0042139 A1 | 11/2001 | Jeffords et al. | |
| 2001/0047409 A1 | 11/2001 | Datta et al. | |
| 2001/0047430 A1 | 11/2001 | Dev et al. | |
| 2001/0052085 A1 | 12/2001 | Dube et al. | |
| 2002/0004733 A1* | 1/2002 | Addante | 705/7 |
| 2002/0032760 A1 | 3/2002 | Matthews et al. | |
| 2002/0050926 A1 | 5/2002 | Lewis et al. | |
| 2002/0075882 A1 | 6/2002 | Donis et al. | |
| 2002/0184528 A1 | 12/2002 | Shevenell et al. | |
| 2002/0188584 A1 | 12/2002 | Ghannam et al. | |
| 2003/0110396 A1 | 6/2003 | Lewis et al. | |

FOREIGN PATENT DOCUMENTS

| | | |
|---|---|---|
| EP | 0 319 998 B1 | 6/1989 |
| EP | 0 338 561 B1 | 10/1989 |
| EP | 0 342 547 B1 | 11/1989 |
| EP | 0 616 289 | 9/1994 |
| EP | 0 686 329 B1 | 12/1995 |
| WO | WO 89/07377 | 8/1989 |
| WO | WO 93/00632 | 1/1993 |
| WO | WO 95/20297 | 7/1995 |
| WO | WO 96/09707 | 3/1996 |
| WO | WO 97/16906 | 5/1997 |
| WO | WO 97/29570 | 8/1997 |
| WO | WO 97/37477 | 10/1997 |
| WO | WO 97/44937 | 11/1997 |
| WO | WO 98/42109 | 9/1998 |
| WO | WO 98/44682 | 10/1998 |
| WO | WO 98/52322 | 11/1998 |
| WO | WO 99/27682 | 6/1999 |

| | | |
|---|---|---|
| WO | WO 00/13112 | 3/2000 |
| WO | WO 00/72183 | 11/2000 |
| WO | WO 01/86380 | 11/2001 |
| WO | WO 01/86443 | 11/2001 |
| WO | WO 01/86444 | 11/2001 |
| WO | WO 01/86775 | 11/2001 |
| WO | WO 01/86844 | 11/2001 |
| WO | WO 02/06971 | 1/2002 |
| WO | WO 02/06972 | 1/2002 |
| WO | WO 02/06973 | 1/2002 |

OTHER PUBLICATIONS

Lewis, Lundy, Service Level Management for Enterprise Networks, Artech House, 1999.

Integrated Network Management V: Integrated Management in a Virtual World, Proceedings of the Fifth IFIP/IEEE International Symposium on Integrated Network Management, San Diego, California, May 12-16, 1997, Lazar A. et. al, eds., Chapman & Hall, 1997.

Stevenson Douglas W., Network Management: What it is and what it isn't, Apr. 1995, http://www.sce.carleton.ca/netmanage/NetMngmnt/NetMngmnt.html (visited Aug. 30, 2004).

Network and Distributed Systems Management, Morris Sloman, Ed., Addison-Wesley, 1994.

RFC 1158—Management Information Base for network management of TCP/IP-based internets: MIB-II, Network Working Group, M. Rose, Ed., May 1990, http://www.faqs.org/rfcs/rfc1158.html (visited Aug. 30, 2004).

RFC 1157—Simple Network Management Protocol (SNMP), Network Working Group, J. Case et al., Eds., May 1990, http://www.faqs.org/rfcs/rfc1157.html (visited Aug. 30, 2004).

RFC 1156—Management Information Base for network management of TCP/IP-based internets, Network Working Group, K. McCloghrie and M. Rose, Eds., May 1990, http://www.faqs.org/rfcs/rfc1156.html (visited Aug. 30, 2004).

RFC 1155—Structure and identification of management information for TCP/IP-based internets, Network Working Group, M. Rose and K. McCloghrie, Eds., May 1990, http://www.faqs.org/rfcs/rfc1155.html (visited Aug. 30, 2004).

ISO/IEC 10164-1: 1993, Information technology—Open Systems Interconnection—Systems Management: Object Management Function.

ISO/IEC 10164-2:1993, Information technology—Open Systems Interconnection—Systems Management: State Management Function.

ISO/IEC 10164-4:1992, Information technology—Open Systems Interconnection—Systems management: Alarm reporting function.

ISO/IEC 10164-5:1993, Information technology—Open Systems Interconnection—Systems management: Event Report Management Function.

ISO/IEC 10165-1:1993, Information technology—Open Systems Interconnection—Management Information Services—Structure of management information: Management Information Model.

ISO/IEC 9595:1998, Information technology—Open Systems Interconnection—Common management information service.*

ISO/IEC 9596-2:1993, Information technology—Open Systems Interconnection—Common management information protocol: Protocol Implementation Conformance Statement (PICS) proforma.*

ISO/IEC 7498-4:1989, Information processing systems—Open Systems Interconnection—Basic Reference Model—Part 4: Management framework.*

Gilbert R., et al., CNMGRAF—Graphic Presentation Services for Network Management, ACM 0-89791-164 (1985).*

M. Gargano, et al., A Logical Data Model for Integrated Geographical Databases, IEEE (1990).*

Micromuse's Netcool/Omnibus, A Cool MOM Makes It Easy, Data Communications, Jan. 1995.*

* cited by examiner

-add transx "Patent"Transaction" inactive "Patent"Transaction" 600 "Enter"a"description"here"
 -addstep http "Patent"Transaction" 1 www.nytimes.com / 80 30 GETALL "" "" "" "The"New"York"Times"on"the"Web" Form "User-Agent" "Mozilla/4.0"(compatible;"MSIE"5.0)" HEAD DVC GOOD 4 1 FAILED 3 status NEQ 200 status NEQ 301 status NEQ 302 2 FAILED 1 totalTime GT 26 3 MARGINAL 1 totalTime GT 25 4 FAILED 1 regexpStatus EQ FAILED
 -addstep http "Patent"Transaction" 1 www.slashdot.org / 80 30 GETALL "" "" "" "Slashdot:"News"for"nerds, "stuff"that"matters" Form "User-Agent" "Mozilla/4.0"(compatible;"MSIE"5.0)" HEAD DVC GOOD 4 1 FAILED 3 status NEQ 200 status NEQ 301 status NEQ 302 2 FAILED 1 totalTime GT 23 3 MARGINAL 1 totalTime GT 24 4 FAILED 1 regexpStatus EQ FAILED
 -addstep http "Patent"Transaction" 1 slashdot.org users.pl?op=savemiscopts&opt_osdn_navbar=0 80 34 GETALL "" "" "" "Slashdot"Users" Form "User-Agent" "Mozilla/4.0"(compatible;"MSIE"5.0)" HEAD DVC GOOD 4 1 FAILED 3 status NEQ 200 status NEQ 301 status NEQ 302 2 FAILED 1 totalTime GT 42 3 MARGINAL 1 totalTime GT 33 4 FAILED 1 regexpStatus EQ FAILED
 -addstep http "Patent"Transaction" 1 slashdot.org/users.pl?op=userlogin&unickname=IPLawyer& upasswd=password&userlogin=Login 80 30 GETALL "" "" "" "Slashdot"Users" Form "User-Agent" "Mozilla/4.0"(compatible;"MSIE"5.0)" HEAD DVC GOOD 4 1 FAILED 3 status NEQ 200 status NEQ 301 status NEQ 302 2 FAILED 1 totalTime GT 24 3 MARGINAL 1 totalTime GT 24 4 FAILED 1 regexpStatus EQ FAILED

FIG. 4

SYSTEM AND METHOD FOR TRANSACTION RECORDING AND PLAYBACK

RELATED APPLICATIONS

This application is related to the following patent applications, which are hereby incorporated by reference in their entirety:

Application Ser. No. 09/724,025 titled METHOD AND SYSTEM FOR PREDICTING CAUSES OF NETWORK SERVICE OUTAGES USING TIME DOMAIN CORRELATION, filed Nov. 28, 2000;

Application Ser. No. 09/910,676 titled IMPROVED EVENT DATABASE MANAGEMENT METHOD AND SYSTEM FOR NETWORK EVENT REPORTING SYSTEM, attorney docket no. 3882/7, filed Jul. 20, 2001; and Application Ser. No. 09/928,245 titled SYSTEM AND METHOD FOR TESTING MULTIPLE DIAL UP POINTS IN A COMMUNICATIONS NETWORK, filed Aug. 10, 2001.

BACKGROUND OF THE INVENTION

The invention disclosed herein relates generally to tracking a user's actions within an information system. More particularly, the present invention relates to tracing a user's navigation between information resources within an information system to create a transaction data file and replay the steps contained therein to verify the level of service being offered by the server hosting the information resource.

Internet search engines are employed by users to locate specific information resources on the Internet, e.g., web pages and the interconnections between them. In order to catalog vast number of information resources on the Internet, these search engines deploy automated applications referred to alternately as "spiders", "crawlers", or "bots". Applications such as these navigate to and catalog sites submitted to the search engine by the site owners as new or updated and, therefore, need to be cataloged. These applications may also be given a set of seed sites to begin their process of navigation and cataloging. Spider applications get their name from the fact that they typically retrieve information resources form a plurality of sites in parallel. Spiders and bots may also build a catalog of sites by following all the hypertext links in a series of web pages until all the pages have been read.

Spiders, crawlers, and bots are useful tools in cataloging the contents of web sites and other servers of information resources. These applications, however, only collect information regarding the sites that they visit once. They are therefore only able to verify the availability of an information resource when the resource is cataloged. In order for a user to determine the availability of an information resource identified by a search engine, he or she must attempt to load the resource. Because no availability or service level information is provided, time is needlessly consumed testing hyperlinks instead of being directed to information resources that are indeed available when the user is attempting to access them.

A similar problem is encountered by entities that manage a large number of servers where availability must be ensured. In order to guarantee availability of the information resources hosted by the managed servers, a user must attempt to retrieve selected information resources on a regular basis. Alternatively, a script or macro may be set to query each server on a regular basis to ensure that they are transmitting data. This alternative, however, fails to provide information regarding the levels of service being offered by the managed servers. A third alternative involves a combination of the two methods, which is clearly a less than ideal solution to the problem.

There is thus a need for a system and method whereby a user's transactions are automatically learned or recorded in order to maintain a history of a user's navigation transaction. Advantageously, this history may be used to retrace the steps of a user's transaction to validate availability of resources accessed by the user and the service levels being offered.

BRIEF SUMMARY OF THE INVENTION

The system and method of the present invention comprises functionality to record the steps of a user's navigation transaction and to subsequently play back those steps to determine service availability and levels. The present invention comprises a method for recording a user's steps in a navigation transaction by retrieving an information resource and calculating service level thresholds and the time required to retrieve the information resource. The service level thresholds and parameters regarding the information resource is recorded in a transaction data file as a step comprising the navigation transaction.

The method of recording the steps of a user's navigation transaction may further comprise aborting the step of retrieving when a timeout threshold is exceeded. The step of recording may comprise recording a number of parameters including the address and port of the retrieved information resource and generating conditional logic used to instruct service software as to the correct service level code to return based on the service software's observed time to retrieve the information resource. The step of generating conditional logic comprises conditional logic defining service levels of GOOD, MARGINAL, and FAILED. The step of recording may comprise recording the step information in a hierarchy, each step comprising an entry in the hierarchy with the transaction being the top level of the hierarchy.

The present invention also comprises a method for playing back one or more steps executed by a user as part of a navigation transaction, the navigation transaction stored in a transaction data file. The method for playing back one or more steps executed by a user as part of a navigation transaction comprises identifying a first step within the transaction, executing the first step by attempting to retrieve an information resource identified by the step, and returning a level of service for a server hosting the information resource identified by the step.

As a transaction data file may comprise multiple steps, the method may further comprise identifying one or more subsequent steps within the transaction, executing the one or more subsequent steps by attempting to retrieve information resources identified by the subsequent one or more steps, and returning levels of service for servers hosting the information resources identified in the subsequent one or more steps. The time to execute the first step may be calculated and whereby the step of returning the level of service comprises calculating the level of service based on the amount of time required to execute the first step.

The present invention also comprises a system for recording a user's steps in a navigation transaction and for playing back those steps in order to determine a level of service for each step. The system of the present invention comprises transaction recorder software. The transaction recorder software is operative to calculate service level thresholds and the time required to retrieve a requested information resource. The transaction recorder software is further operative to generate conditional logic used to instruct service software as to the correct service level code to return based on the service software's observed time to retrieve the information resource. The system also comprises service software operative to attempt to retrieve the requested information resource and return a level of service defined by the conditional logic based on the amount of time required to retrieve the information resource.

The invention further provides a transaction data structure for facilitating recordation of a user's navigation steps within a transaction and playback of those steps. The transaction data structure may be structured as a hierarchical arrangement of data whereby the top level of the hierarchy defines the name and description of the transaction. Within the transaction is a second level of the data hierarchy where each step of the transaction is defined, e.g., each information resource retrieved. According to an alternative embodiment of the invention, the transaction data file is formatted according to an XML schema defining the various steps of the transaction and associated data.

The data necessary to replay each step in the transaction is included within the transaction file. More specifically, these data include the information resource to retrieve, the action to perform, and the status to return based on the time required to retrieve the information resource. In this manner, the information required to retrieve the resource, logic regarding how to define whether the retrieval is successful, and the level of service provided by the server hosting the information resource identified in the step.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 4 is a transaction data file presenting the steps of a user's transaction according to one embodiment of the present invention;

DETAILED DESCRIPTION OF THE PREFERRED EMBODIMENTS

Figure 1:
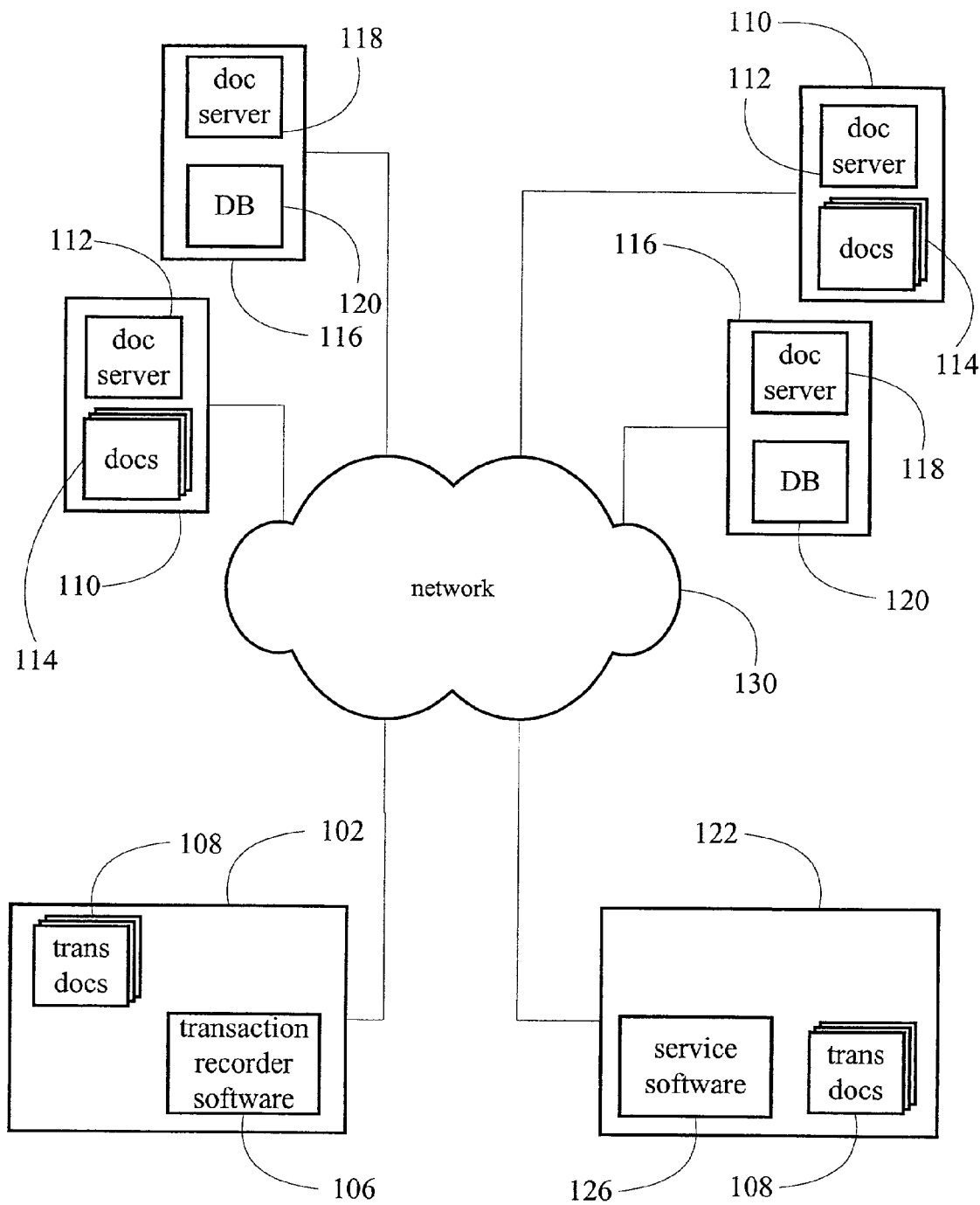
FIG. 1 is a block diagram presenting the transaction recording software in a network environment according to one embodiment of the present invention.

With reference to FIGS. 1 through 7, embodiments of the invention for transaction recording and playback are presented. In a networked computing environment, for example, the Internet, a number of computing devices 102, 110, 116, and 122 are interconnected through one or more networks 130. Through the use of the network 130 and associated hardware and software components that comprise the network infrastructure, e.g., routers and switches, the computing devices are capable of transmitting disparate types of data between themselves.

The World Wide Web (WWW) presents one example of a networked computing environment. According to the World Wide Web Consortium (W3C), the World Wide Web encompasses "the universe of network accessible information, an embodiment of human knowledge". More specifically, the WWW comprises all the information resources and users on the Internet that are using the Hypertext Transfer Protocol (HTTP) to exchange information, typically in the form of HTML web pages. Indeed, the WWW, and the Internet in general, may be used to pass many kinds of disparate information resources between requesting clients and responsive servers.

A computing device 102 is provided that is used to navigate between servers 110 and 116 located on the network providing information in response to requests. The computing device 102, which may be any type of personal, portable or handheld computing device, comprises transaction recorder software 106 that is used to generate and maintain a record of the servers 110 and 116 accessed by the client 102. Advantageously, the transaction recorder software 106 may incorporate one or more software components (not pictured) that allow the user to issue requests for information resources to servers accessible over the network 130, the transaction recorder 106 software itself may also be retrieved off a network 130 and installed into the computing device's 102 local memory. Alternatively, the transaction recorder software 106 may be executed in conjunction and communication with web browser software, such as MICROSOFT INTERNET EXPLORER™, whereby information requests, as well as information returned to the browser in response to these requests, is analyzed and recorded by the transaction recorder software 106. The transaction recorder software 106 is used to analyze the retrieved information resources and record data that includes, but is not limited to, the title of the retrieved information resource, the server or page where the use navigated from, the command passed to the server, and the time required to retrieve and render the information resource for presentation to the user.

Although there are many types of servers that comprise functionality to deliver information according to the Hypertext Transfer Protocol (HTTP), these servers 110 and 116 generally distribute either static 110 or dynamic 116 information. Servers that transmit static information 110 comprise a document server 112, e.g., a web server, and a collection of one or more static documents 114, e.g., HTML or XML documents, for distribution upon request. A client 102 requests a document by providing the document's uniform resource locator (URL) identifying the server containing the document 110 as well as the document itself 114. Accordingly, the transaction recorder software 106 executing on the requesting client 102 makes a note of the requested transaction and associated parameters, e.g., time to load the information resource, which is either appended to an existing or newly created transaction data file 108.

Other information servers 116 dynamically generate pages of information in response to information requests. These pages, for example, may be tailored to contain information pertaining to only certain topics or to the profile of the user making the information request. The document server software 118, e.g., a web server, dynamically generates a URL to retrieve content, typically stored in a database 120 or other data store, and prepare the page at the time it is requested. The transaction recorder software 106 maintains the dynamically created URLs used to reference these information resources so that the resource may be recreated and the document accessed at a point in the future. As is the case when retrieving static information 114 from a document server 112, the transaction recorder software 106 executing on the requesting client 102 makes a note of the requested transaction and associated parameters, e.g., time to load the information resource, the action performed by the transaction software, etc. This transaction information is either appended to an existing or newly created transaction data file 108.

The transaction recorder software 106 generates one or more transaction data files 108 as the user navigates between information resources or pages hosted by servers 110 and 116 located on a network 130, each file containing a sequence of information resources retrieved from the network and parameters associated therewith. These transaction data files 108 may be transmitted over the network 130 to a service server 122. The service server 122 comprises service software 126 that is used to test the availability of servers 110 and 116 on the network 130. Alternatively, the computing device executing the transaction software 102 may directly upload the transaction data file to the service server 122 in order to simplify integration of the two. By supplying the address of the service server 122, e.g., an IP address, the transaction recorder software may perform a direct transfer by utilizing HTTP.

The service software 126 loads a transaction data file 128 received from a client device 102 and proceeds to "playback" the information contained therein. For example, suppose a transaction data file 108 comprises information indicating that the user visited three web sites and requested several pages of information from each site. As is explained in greater detail herein, the transaction data file 108 comprises resource and associated parameter information as collected by the transaction recorder software 106. Using the data contained in the transaction data file 108, the service software 126 attempts to access and retrieve each piece of information that the transaction data file 108 indicates that the user retrieved. In this manner, the service software 126 plays back the user's actions to ensure that all the retrieved resources are available on the network. Moreover, the service software 126 uses the data in the transaction file to calculate the level of service being offered by each server 110 and 116.

One advantageous application of the invention is whereby a user loads information into the service software from a variety of managed servers 110 and 116 that is captured by the transaction recorder software 106 in a transaction data file 108. Using the transaction data file 108 and service software 126, the user may ensure, at any point in time, that the managed servers 110 and 116 are available on the network 130. As is explained in greater detail herein, the service software 126 calculates a level of service for each server hosting an information resource retrieved by the user as defined by the steps in the transaction data file. The service level is referred to as discrete value classification (DVC) and, according to one embodiment, may be set to GOOD, MARGINAL, or FAILURE.

According to one embodiment of the invention, the service software 126 comprises part of the NETCOOL® Internet Service Monitor package for network service monitoring developed by Micromuse Inc. As described further in the above referenced patent applications, incorporated herein by reference in their entirety, the ISM provides real-time fault management and service assurance. Network probes and monitors provided by the ISM collect event information from popular network environments such as SNMP and non-SNMP management applications, voice or data networking equipment, Internet and wide-area services, and computer systems and databases. Events are monitored, e.g., common network occurrences such as alerts, alarms, or other faults, which may be reported in customizable graphical and text formats allowing network operators to graphically see what is happening within the network in real-time. The addition of the service software to the ISM allows a user to define one or more transactions for playback at a later time with an indication of the service level being provided by each step within the transaction.

Figure 2:
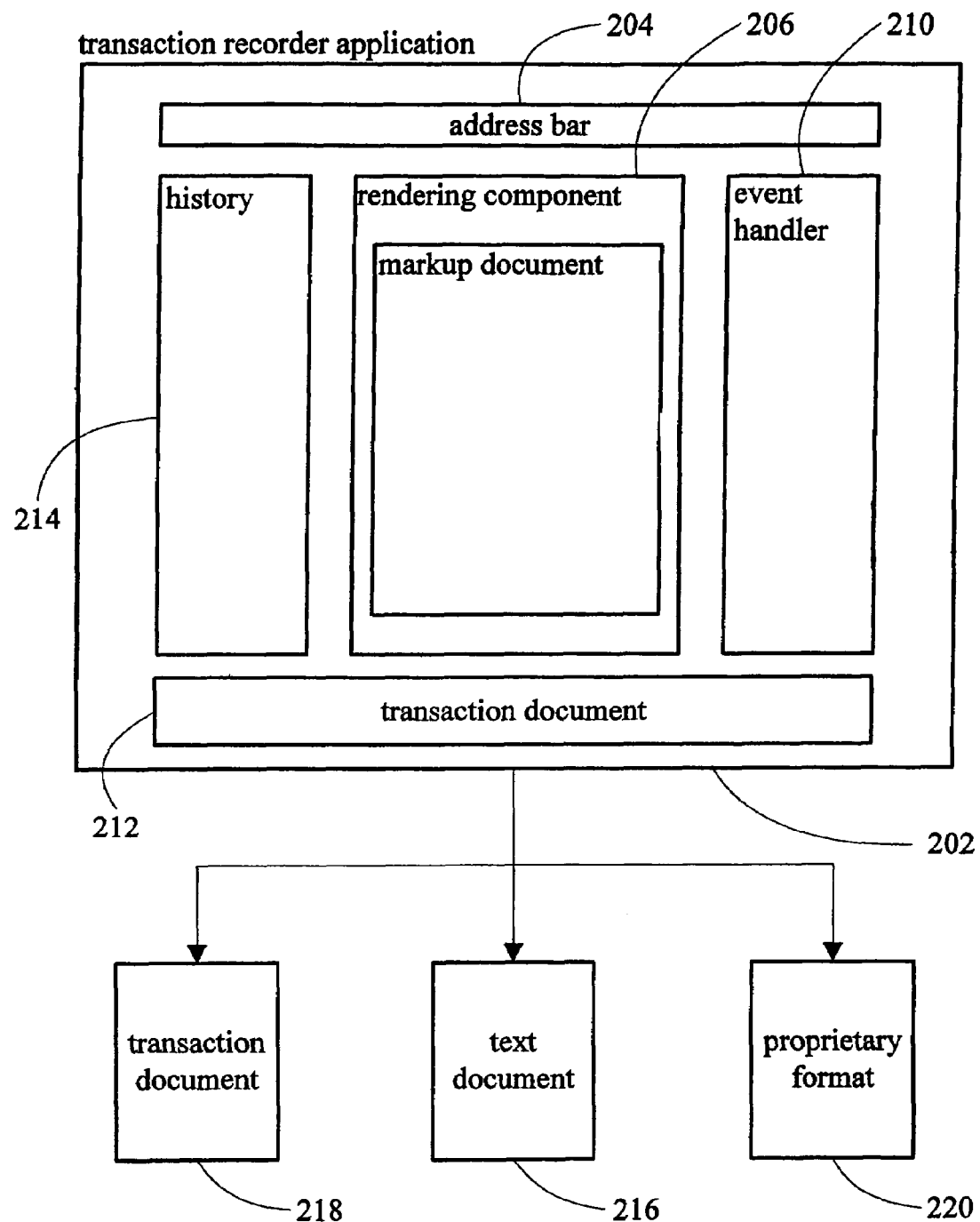
FIG. 2 is a block diagram presenting an arrangement of software components for transaction recording according to one embodiment of the present invention.

Turning to FIG. 2, the software components that comprise the transaction recorder software introduced in FIG. 1 are presented in greater detail. Software components 204, 206, 210, 214 comprising the transaction recorder application 202 are executed by a programmable digital microprocessor (not pictured) in order to record the information resources retrieved by a user, e.g., HTML web pages, and parameters associated with those resources. These software components include an address bar 204, a rendering component 206, an event handler 210, and a history component 214. Alternatively, the transaction recorder application 202 may comprise fewer software components. According to this embodiment, the transaction recorder application 202 interacts with a web browsing program whereby functionality, such as HTML rendering and event handling, is provided by the browser through inter-component communication accomplished via COM, EJB, or other similar component communication model. For example, using Microsoft OLE (Object Linking and Embedding) mechanisms, a host application (the transaction recorder application) may turn off menus and toolbars of the guest component (e.g., Microsoft Internet Explorer) and supply its own UI as well as intercept context menus and message boxes generated the by guest component.

According to one preferred embodiment, a user interacts with the transaction recorder application 202 through a graphical user interface in order to supply the location of desired resources and view the retrieved results. Using graphical controls presented to the user on a display device, the user supplies a URL for a desired information resource in the address bar component 204. The formulated resource request is passed to the event handler 210 using one of the inter-component communication methods well known to those skilled in the art. The event handler component 210 is responsible for receiving events and acting on events generated by the other software components of the application 202.

A rendering component 206 is provided to receive information and present it to the user on a display device. The rendering component 206 receives markup or other data and is operative to render the resultant page. For example, where the information resource is an HTML web page, the rendering component reads each markup tag and associated data comprising the page in order to present the page to the user. Information resources, however, mat be written in a variety of markup languages and comprise data other than ASCII text, for example, XML, VRML, SGML, GIF, JPEG, etc.

Each information resource typically comprises a MIME header that is used by the rendering component to select an appropriate "player" application for the type of data the header indicates. The MIME header allows the rendering component to display a wide variety of content types in additional to providing functionality that allows it to render content types not presently developed. According to some embodiments, the rendering component is a web browser that is not integrated within the transaction recorder application. Instead, the transaction recorder application uses inter-component communication to take advantage of the rendering functionality provided by the web browser.

Upon receiving a request for a resource from the address bar 204, the event handler attempts to initiate communication with the target server that contains the desired resource. According to some embodiments, the event handler 210 may work with other components and/or applications in order to retrieve the resource. The event handler 210 issues an information request to the target server for the information resource supplied in the address bar 204. The target server receives the request and begins to transmit the information resource, which is received by the transaction recorder application 202 and passed to the rendering component 206. Where the target device or information resource is unavailable, a page of information indicting this result is passed to the rendering component.

The event handler 210 is also operative to receive an alert indicating that the information resource has been received, rendered, and navigation is complete. The information resource is examined and information is collected regarding the rendered information resource. Information captured includes, but is not limited to, the visited URL, the time required to download and render the complete information resource, the method used to get the page, any parameters passed to retrieve the page, e.g., POST parameters.

The retrieved information regarding the information resource is recorded in a transaction structure 212, which is a transient storage structure used to maintain the transaction information before it is written out to a persistent storage device. Each step in a transaction created using the transaction recorder application 202 is assigned a name that is appended to the start of the new transaction in order to identify the transaction.

According to embodiments of the invention, the transaction structure 212 is a nested hierarchy of steps of navigation requests for information resources performed by the user. At the top level of the hierarchy is the name of the transaction. Following are the information resources retrieved by the user, e.g., the web sites the user navigates to and requests pages from. Nested in the hierarchy one level below each recorded information resource is data regarding the information request. At a minimum, the transaction recorder application 202 maintains within the transaction structure 212 the information resource requested, the action performed, and the amount of time required to retrieve the information resource. The service software uses the information exported from the transaction structure 212 by the transaction recorder software 202 to determine whether the recorded information resources are available.

Also provided as part of the transaction recorder application 202 is a history component 214. As the user executes steps within a transaction, e.g., information resources are navigated to and retrieved, information regarding the step is appended to the transaction structure 212. The addition of each entry to the transaction structure 212 triggers an event that updates the history component to reflect the additional step that is added to the transaction structure. The history component 214 may be presented to the user as a graphical control on a display device. The GUI control may be a tree control that presents the sequence of information resources retrieved and data regarding each information resource in a hierarchical fashion; the data being retrieved from the transaction structure 212. Advantageously, where the history component 214 is a graphical control, an input device may be used to select individual entries from the history component 214 for removal, thereby instructing the transaction application 202 to remove the transaction entry from the transaction structure 212.

The transaction recorder application 202 is capable of exporting the contents of the transaction structure in a variety of formats 216, 218, and 220. Data for the steps that are held in the transaction structure 212 may be written to a storage device as an ASCII text document 216. The user is capable of modifying any value in the text file through the use of a standard text editor or word processor capable of reading ASCII text. In order to support languages other than those based on the Roman alphabet, the text document 216 may be output using Unicode character set.

The transaction recorder application 202 may also output the contents of the transaction structure 212 in a native binary format used by the application 202. Outputting files according to this format 218 allows the file to be loaded back into the transaction structure 212 at a later point and continue to add steps to the structure 212. Likewise, the file 218 may be loaded and transactions removed from the structure 212. The application may also be supplied with formatting details regarding proprietary file formats for use with specific applications and output the contents of the transaction structure 212 according to the proprietary file format 220.

Figure 3:
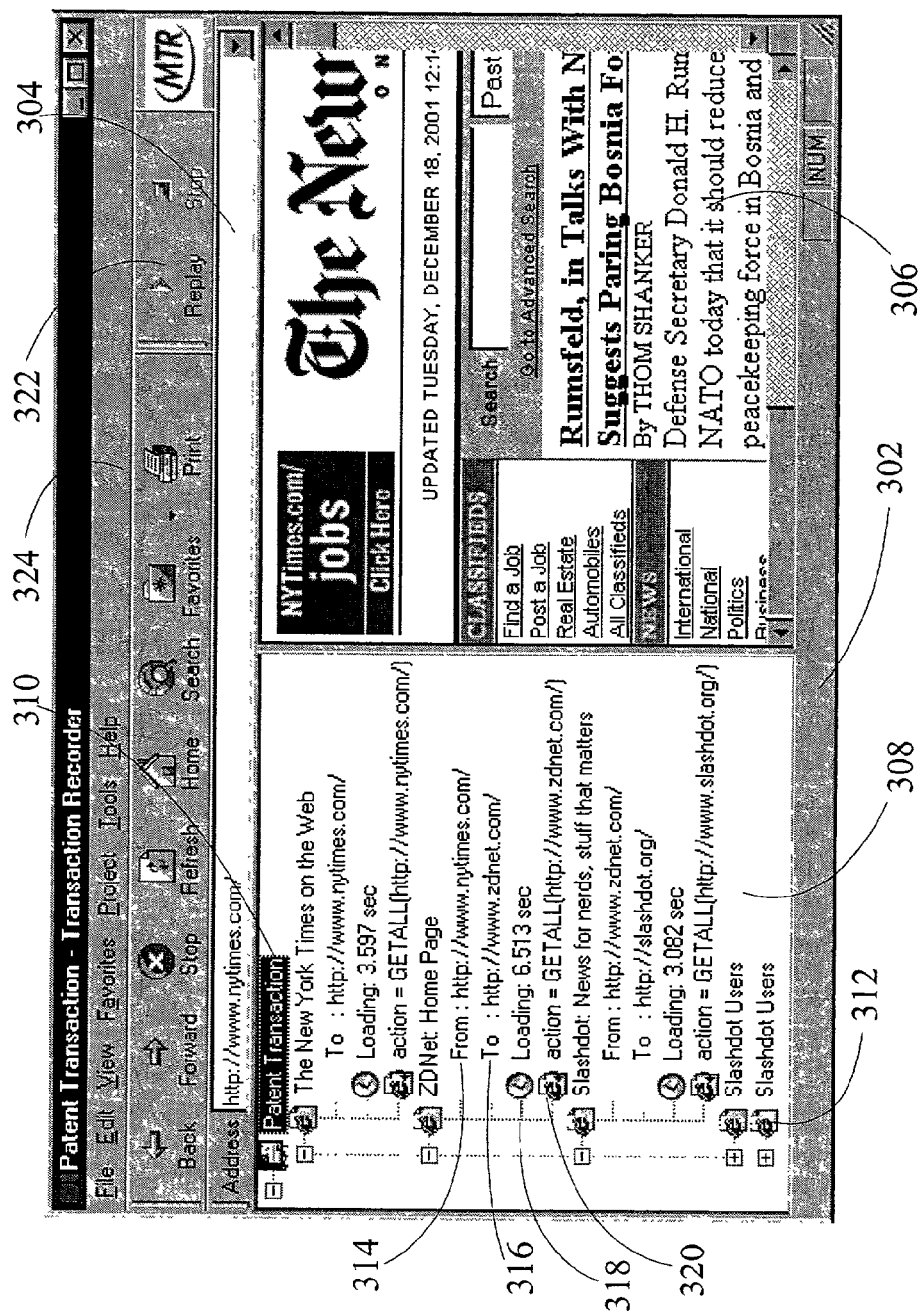
FIG. 3 is a screen diagram presenting a configuration of graphical controls for transaction recorder software according to one embodiment of the present invention.

A screen diagram presenting one embodiment of the transaction recording application illustrated in FIGS. 1 and 2 is introduced in FIG. 3. As described in the previous figures, the transaction recorder application 302 is divided into a number of control areas 304, 306, 308, 322, and 324. Information resources, e.g., HTML web pages server over the Internet by a web server, may be loaded by supplying the address of the resource to the transaction application via the address bar 304, which is a graphical control for interacting with the address bar software component presented earlier. When a valid address is supplied through the address bar 304, the information resource is retrieved and rendered by the rendering component for presentation on the display device within a rendering window 306. Also provided are standard web browser controls 322 that assist in navigation and menu controls 324 that allow the user to customize the application's 302 settings.

According to some embodiments of the invention, the address bar 304, rendering window 306, browser 322 and menu 324 controls may be provided by hooks to Microsoft Internet Explorer. The Internet Explorer component MSHTML follows the standard OLE mechanisms for negotiating with the container for menu merging and displaying toolbars. A host of MSHTML, therefore, can turn off the MSHTML menus and toolbars and supply its own user interface with the underlying software components or use the supplied interface as shown by the use of standard Internet Explorer controls 304, 306, 322, 324.

As the user navigates between information resources using the address bar 304, navigation controls 322, and hyperlinks presented in the rendering window 306, the navigation steps are written to the transaction structure and displayed to the user through the history component's user interface 308. The history UI 308 displays each step included in the current transaction structure with the name of the current transaction structure presented as top level of a hierarchy of transactions 310. Lying one level beneath the transaction structure name 310 are one or more steps 312 that comprise the transaction structure as manifested by the users navigation activities.

As described above, the transaction structure maintains information regarding each step within the transaction, which is displayed by the history component 308 within the hierarchy beneath the step that the information is associated with 314, 316, 318, and 320. Transaction information presented to the user 308 in this embodiment includes URLs both for the "From" and "To" information sources, 314 and 316 respectively, that the user is navigating between. In the present example, the user is navigating from the root page of the New York Times web site to the root page of the ZDNet web site. Also recorded and presented is the time 318 in seconds that was required for the requested page to be retrieved and rendered. Although the load time 318 is presented here in seconds, other time measurements are contemplated by the invention, e.g., milliseconds. The last data item displayed by the history component 308 is the method used to retrieve the requested page 320, e.g., GETALL or POST. Although not presented, the history component 308 may display POST parameters and other data associated with the transaction as maintained by the transaction structure. While the standard HTTP requests are GET and POST, the internal convention GETALL is used by the transaction recorder software to issue instructions to GET the page and GET each element on the page.

Turning to FIG. 4, the text of an exemplary exported transaction data file is presented. As described above, the exported transaction file is preferably structured as a hierarchical arrangement of data. The top level of the hierarchy 402 defines the name and description of the transaction. Within the transaction is a second level of the data hierarchy where each step of the transaction is defined 404, 406, 408, 410. According to an alternative embodiment of the invention, the transaction data file is formatted according to an XML schema defining the various steps of the transaction and associated data.

Reading the transaction data file as generated by the transaction recorder software, the transaction recording software writes a new transaction entry 402 to the transaction data file when a new file is created. After the file is initialized, the software adds a new step to the file indicating that the user navigates to the web site for the New York Times 404, which is written to the data file with parameters regarding the step. The parameters written to the exported data file and their use are explained in greater detail in FIGS. 5 and 7. The transaction recording software tracks that the user navigates to the Slashdot web site and adds an associated step entry to the transaction data file 406. The software also tracks the user as he or she navigates and retrieves additional information resources, e.g., web pages, from the Slashdot web site, 408 and 410. According to some embodiments, the order in which the recorded steps are added or arranged within the transaction data file is irrelevant.

As can be seen by the data comprising an individual step within the transaction 412, and as is explained in greater detail herein, all data necessary for the service software to replay the step is included within the transaction file. More specifically, these data include the information resource to retrieve, the action to perform, and the status to return based on the time required to retrieve the information resource is included 412. In this manner, the service software has the information required to retrieve the resource and logic regarding how to define whether the retrieval is successful and the level of service provided by the server hosting the information resource identified in the step.

Figure 5:
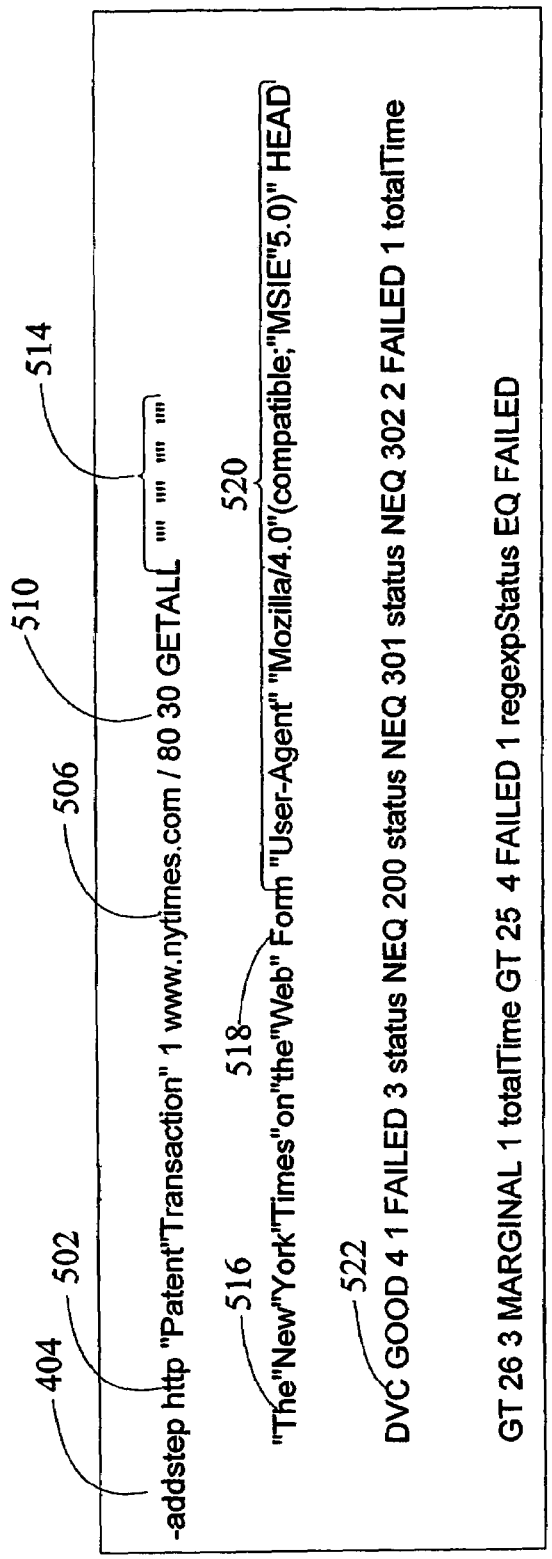
FIG. 5 is another view of a transaction data file presenting a single step of a user's transaction according to one embodiment of the present invention.

A breakdown of the elements comprising one step of a transaction is presented in FIG. 5. As shown in FIG. 4, an addstep flag 404 identifies the new step entry. This value is followed by the transmission method that is used to retrieve the information resource 502, in this example HTTP. Another exemplary transmission method would be SHTTP or Secure Hypertext Transmission Protocol. This value is followed by the address of the server hosting the requested information resource and the actual information resource to retrieve 506, along with the port on which the information resource is available. Here, the server address is www.nytimes.com (a web server transmitting information resources according to HTTP), the requested information resource is "/" or the default root page, and the port number is 80. It should also be noted that, according to this embodiment, the quotation mark character is used to pass the value of a space to the service software upon playback, as spaces are otherwise used to delimit values.

As is explained in greater detail herein, a timeout threshold is supplied 510, set to a value of 30 seconds in this example, in order to prevent the service software from waiting indefinitely for an information resource to be returned. Also recorded is the command issued by the transaction software in order to retrieve the information resource 510. Here, the value GETALL indicates that the software should collect the page and all elements loaded on the page. As opposed to the quotation marks occurring as part of strings, thereby indicating a value of a space within the string, the four quotation marks 514 on the first line of the step represent authentication parameters that are required to be passed to certain severs for access. From left to right, the four sets of quotation marks hold the following values respectively: username, password, form name (where there is a form to identify on the page), and a regular expression value (a string used to evaluate against a retrieved information resource to ensure the proper document is returned). According to this example, none of these values 514 were required by the user to retrieve the default root page from the server www.nytimes.com and are therefore not required by the service software.

The first value contained on the second line of the step comprises the title of the retrieved information resource 516, a form flag 518 (used to define parameters for form fields where the retrieved information resource comprises a form), and a HEAD parameter 520. The HEAD parameter 520 is required to inform the server hosting the information resource as to what type of application is performing the request and may be used to alter the information resource returned by the server. When played back by the service software, data is transmitted indicating that the software is of the type "Mozilla/4.0 (compatible; "MSIE"5.0)". Once again, the quotation marks forming part of the string are evaluated as spaces.

The balance of the information comprising the step consists of DVC logic 522 that is used by the service software to determine the level of service being offered by the server hosting the information resource that is the object of the step. As a threshold matter, the DVC codes define three levels of service at which a server may be operating: GOOD, MARGINAL, or FAILED. The DVC logic 520 presented in FIG. 5 is reproduced below in Table 1:

TABLE 1

DVC GOOD 4 1 FAILED 3 status NEQ 200 status NEQ 301 status NEQ 302 2 FAILED 1
totalTime GT 26 3 MARGINAL 1 totalTime GT 25 4 FAILED 1
regexpStatus EQ FAILED The value GOOD indicates to the service software that this is the default value to return if the following gates all evaluate to false. The value "4" indicates that the DVC clause comprises four sub-clauses. These sub-clauses are each identified by a sub-clause number. The first sub-clause, identified by the value "1" situated between the value "4" and "FAILED", returns a DVC code of "FAILED" if any one of the next three conditions are true: the status code returned by the server is not equal to 200, 301, or 302.

The second sub-clause, identified by the value "2" situated between the value "302" and "FAILED", indicates that a "FAILED" DVC code should be returned by the service software where the total time to retrieve the requested information resource is greater than 26 seconds. The value 1 instructs the service software that there is only one condition associated with this sub-clause. The third sub-clause instructs the service software that a "MARGINAL" DVC code should be returned where the total time to retrieve the request information resource is greater than 25 seconds. Here again, the value 1 instructs the service software that there is only one condition associated with this sub-clause. The final clause indicates that a "FAILED" DVC code is to be returned where the variable regexpStatus is equal to "FAILED".

The DVC logic presented in Table 1 may be explained using the pseudocode of Table 2:

TABLE 2

```
if((status < > 200) and (status < > 301) and (status < > 302)) then
    DVC = FAILED
else if (totalTime > 26) then
    DVC = FAILED
else if (totalTime > 25) then
    DVC = MARGINAL
else if (regexpStatus = FAILED) then
    DVC = FAILED
end if
```

According to the DVC logic pseudocode presented in Table 2, "status" is set to the code returned by the sever when the step is played back by the service software. The value "totalTime" is set to the time taken by the service software to retrieve the whole information resource and "regexpStatus" is a Boolean value indicating whether a regular expression supplied by the user when the step was recorded is present in the retrieved information resource.

According to one embodiment of the invention, the threshold values associated with each of the DVC codes in the step is calculated using the equation of Table 3:

TABLE 3

Time = MAX(AX+B, min)

The transaction recorder software records the total time required to retrieve the information resource, which is substituted for the variable "X" in the equation of Table 3. This is the time global required to load the whole page where the information resource is a web page. The service software, however, may expect the time as a function of the cumulative time required to retrieve each element comprising the information resource.

A coefficient value, "A", is introduced to "de-parallelise" the retrieve time. In other words, the time it would take to retrieve all elements in a serial, rather than parallel, manner. Where service software expects a global time value, the coefficient is set a value of one. The value of "B" is available to add a time offset to take into account any delays associated with the service software loading the transaction and initiating the request. As this delay is becomes shorter, the value of "B" is set to a correspondingly small value. Finally, the value of the "min" parameter defines a minimum value under which the value should not be set. For example, we may assume that if the global response is less than ten seconds, then a site qualifies as GOOD. These DVC values associated with each DVC code within the DVC logic may be calculated when the information resource is retrieved. Alternatively, the transaction recorder software calculates the DVC values upon export.

Figure 6:
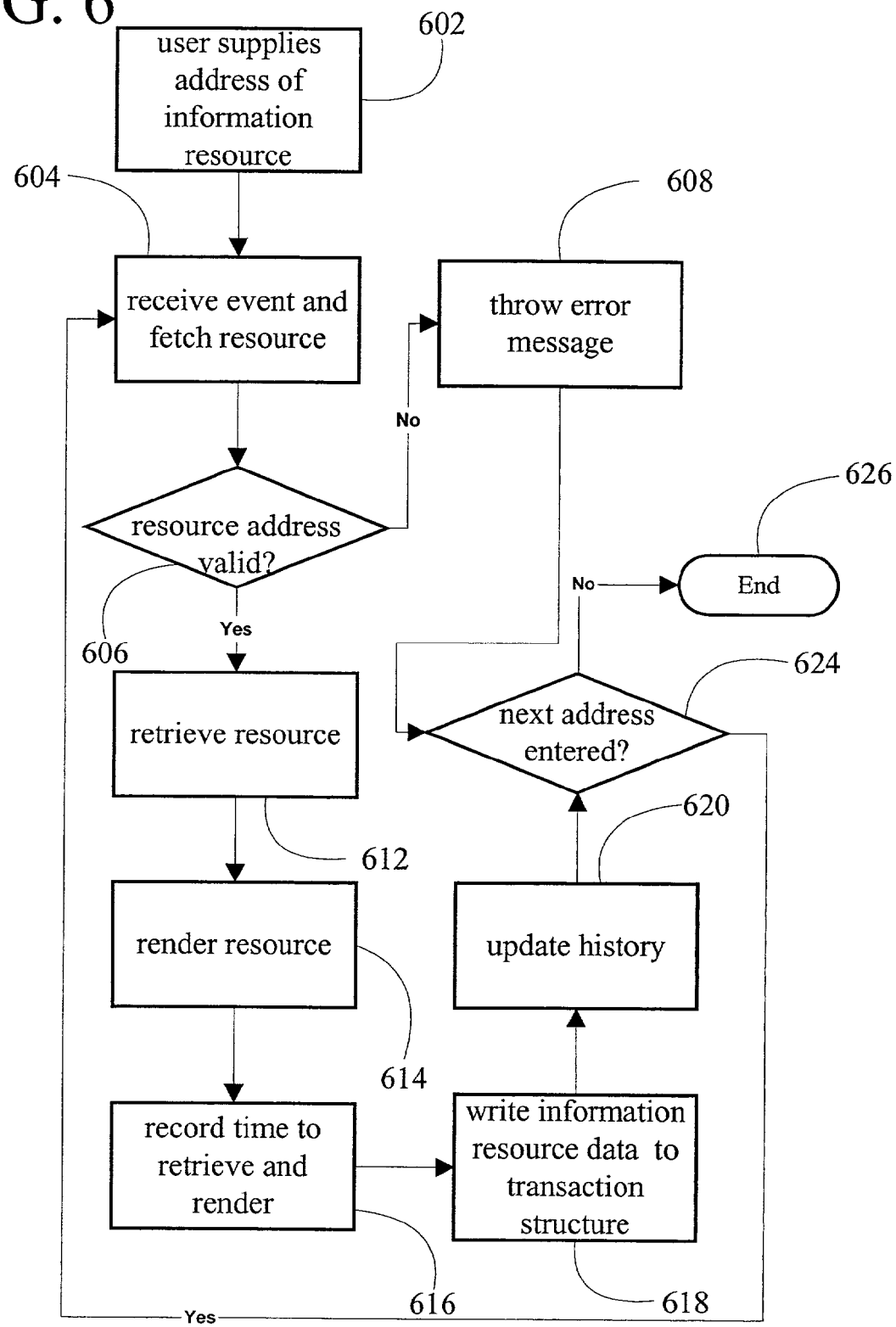
FIG. 6 is a flow diagram presenting method of operating transaction recorder software in order collect a user's transaction steps according to one embodiment of the present invention.

FIG. 6 presents a flow diagram illustrating a method of operating the transaction recorder software presented in FIGS. 1 though 3 in order to generate a transaction data file. Using an input device, such as a keyboard or virtual keyboard presented on a display device and a pointing device, a user supplies an address of an information resource for retrieval, step 602. The user may supply the address by entering it in the address bar or by selecting a hyperlink from within an HTML document. According to one embodiment, the address is a URL for a HTML document located on the Internet. Alternatively, the address may be a URL for an XML document or an image file. Indeed, the present invention contemplates tracking requests for all manner of digital media types and formats. An event is generated indicating that an address has been supplied to the system, which causes the software to attempt open a communication channel with the indicated server and retrieve the information resource, step 604.

A check is performed to determine whether the user has supplied a valid address for retrieval of the information resource, step 606. Where the address supplied by the user is invalid, step 606, the software presents an error message to the user indicative of this fact, step 608. Another check is performed to determine if the user has supplied an additional address, step 624, for example, corrected the malformed address supplied in step 602. If no additional address is supplied, the process concludes, step 626. Where the user supplies a new address, program flow returns to step 604 where the software attempts open a communication channel with the indicated server and retrieve the information resource.

Where the check executed at step 606 returns a value of true indicating the resource address is valid, e.g., the software successfully opened a communication channel with the target server and located the desired information resource, the resource is retrieved from across the network, step 612. The requesting client receives the retrieved information resource, e.g., the client executing the transaction recorder software, and renders it on the client's display device, step 614. According to some embodiments of the invention, the information resource is composed of a plurality of elements, each residing on one or more disparate servers on the network. The transaction recorder software may retrieve these elements that comprise the desired information resource in parallel in order to reduce the time required to retrieve the complete information resource.

A calculation is performed, step 616, to determine the duration of time required to retrieve the requested information resource, step 612, and render it on the display device, step 614. The time calculation is recorded in the transaction structure, step 616. In addition to the time calculation, step 616, resource information is retrieved and recorded, step 618. The recorded information includes, but is not limited to, the previous information resource retrieved (the "From" address), the address of the current information resource (the "To" address), the time required to retrieve and render the information resource, the action performed (e.g., GETALL, POST, etc.). The data written to the transaction structure is also used to populate the history component and associated UI control, step 620. The data presented by the history component provides feedback to the user regarding information collected about the retrieved information resource.

A check is performed to determine if the user has supplied an additional information resource to which to navigate, step 624. If the user has supplied an address for an additional information resource, for example, by selecting a hyperlink off of an information resource previously retrieved where the resource is an HTML document, program flow returns to step 604 where the transaction recorder software attempts to open a communication channel and retrieve the desired resource. Where the user has not supplied the address of an additional information resource for retrieval, program flow terminates, step 626.

Figure 7:
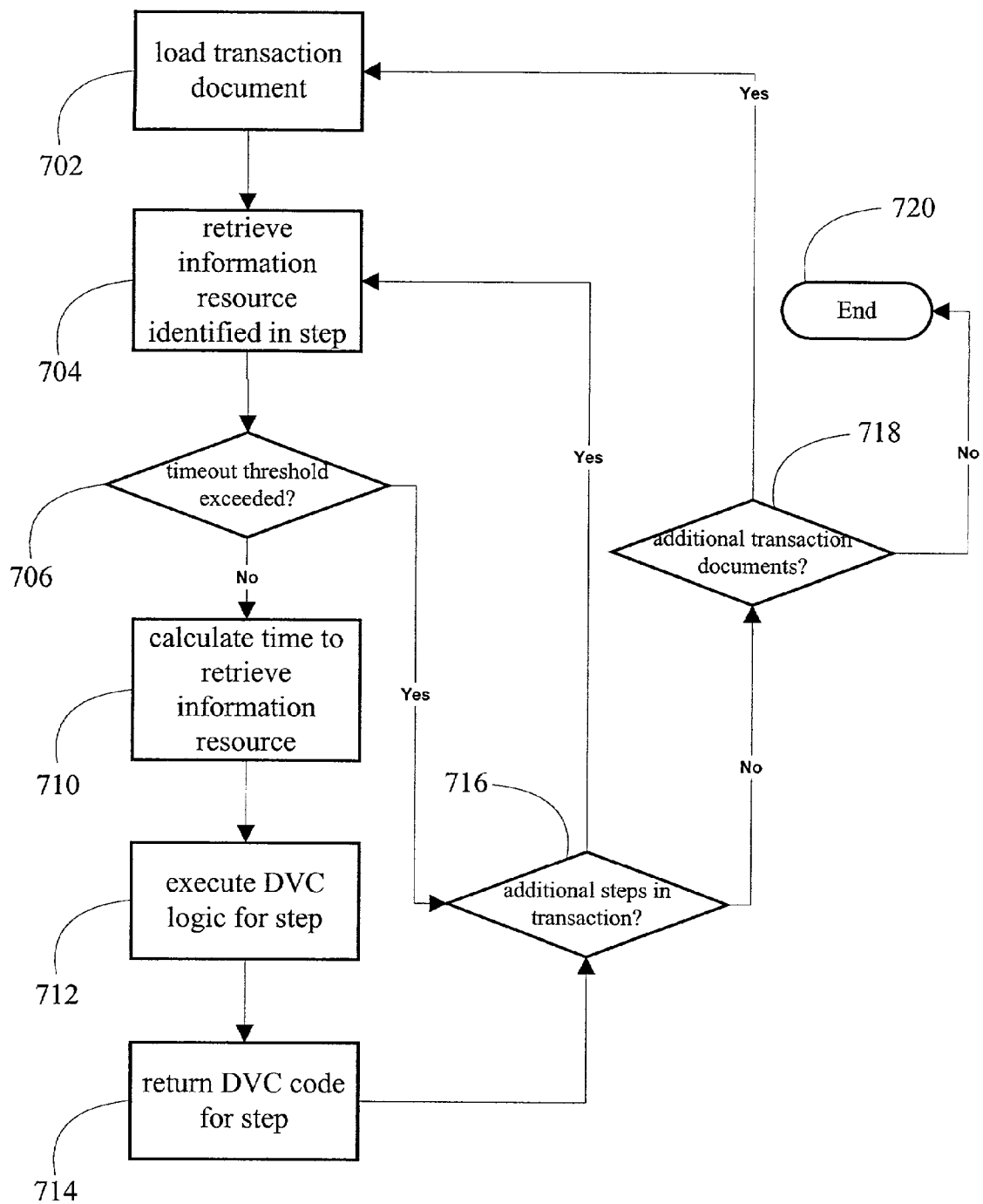
FIG. 7 is a flow diagram presenting a method of using a transaction file recorded by the transaction recorder software to verify the availability of an information resource according to one embodiment of the present invention.

FIG. 7 presents one embodiment of a process for using the service software to play back the steps comprising a transaction data file. The sever executing the service software receives a transaction data file and proceeds to load it into memory for playback, step 702. Typically, a user at a computer executing the transaction recorder software records the steps of a transaction and transmits the completed document to a local storage device attached to the server executing the service software for playback. The transaction data files, however, may reside on a network file device and be retrieved by the service software for playback. Alternatively, the service software and transaction recorder software may be executed by the same server/workstation and share a common storage device. Other permutations are also contemplated by the invention.

The service software starts the transaction by attempting to open a communication channel and retrieve the information resource listed in the first step of the transaction data file, step 704. Alternatively, the user may indicate a step as a starting point for playback. A check is made to determine if a timeout threshold is exceeded without retrieving the information resource, step 706. According to various embodiments, the timeout threshold be may be set either in the transaction data file by the transaction recorder software or by the user through the interface provided by the server software. The use of a timeout mechanism advantageously prevents the service software from crashing by waiting indefinitely to retrieve an information resource.

If the information resource is not retrieved before the timeout threshold expires, step 706, a check is preformed to determine if additional steps are contained within the transaction, step 716. Where additional steps are contained within the transaction being played back, step 716, program flow returns to step 704 where the service software plays the next step in the transaction. If there are no additional steps to perform in the transaction being played back, an additional check is performed in order to determine if additional transactions are scheduled for playback, step 718. The service software provides functionality that allows an administrator or other operator of the software to schedule a set or batch of transaction data files for processing, as opposed to processing each one manually.

According to one embodiment, the service software performs a check within an indicated directory on a storage device to determine if any transaction data files exist that have not been processed, step 718. If so, processing returns to step 702 and the process is repeated until all transaction data files in the directory have been processed. Alternatively, a flag may be set at run time indicating the names and locations of the files to be processed. Batch processing in this manner is useful in situations where an entity is executing the service software on behalf of a number of disparate clients or entities. Where there are no additional transactions to process, the process concludes, step 720.

Returning to step 706, a check is performed to determine if the timeout threshold has been exceeded. Where the information resource is retrieved before the timeout threshold expires, step 706, the service software calculates the elapsed time required to retrieve the information resource, step 710. Based on the calculated time required to retrieve the information resource, step 710, the DVC logic is executed, step 712, as explained by the analysis of the exemplary DVC logic presented in FIG. 5. Using the DVC logic comprising the step presently being executed, the service software determines the appropriate DVC code to return, step 714, and, therefore, the status of the server hosting the retrieved information resource. The DVC code for the step is preferably written to an output file on a persistent storage device when returned, step 714, although it may also be written to transient memory and presented on a display device.

The service software returns the DVC code for the step being played back, step 714, and a check is performed to determine if the transaction comprises additional steps remaining to be played back, step 716. Where additional steps remain to be played back, step 716, processing returns to step 704 where the software plays the next step. If all steps in the transaction have been processed, step 716, a check is performed to determine if any additional transactions are slated for playback, step 718. Processing returns to step 702 where an additional transaction remains to be played back and the process is repeated for each step in the transaction. If all transactions have been processed, step 718, the process of playing back the transaction data file concludes, step 720.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for determining a level of service for a server in a network, the method comprising:
   at a first computer coupled to the network:
      a user performing one or more steps as part of a transaction involving use of the service, the one or more steps being performed according to one or more parameters;
      transaction recorder software residing on the first computer recording the one or more steps and the one or more parameters in a transaction data file; and
      sending the transaction data file from the first computer to a second computer coupled to the network;
   at the second computer, service software residing on the second computer:

identifying the one or more steps and the one or more parameters in the transaction data file;

executing the one or more steps using the one or more parameters to thereby replicate the transaction performed by the user; and determining the level of service for the server based on the executing.

2. The method of claim 1 further comprising the transaction recorder software generating at the first computer conditional logic used to instruct the service software at the second computer as to a service level code to return.

3. The method of claim 2 wherein the generating conditional logic comprises generating conditional logic defining service levels of GOOD, MARGINAL, and FAILED.

4. The method of claim of claim 2, wherein the transaction recorder software determines a level of service at the first computer based on the one or more steps performed by the user, and wherein generating the first conditional logic is based on the determined level of service at the first computer.

5. The method of claim 1 wherein the recording comprises recording the step information in a hierarchy, each step comprising an entry in the hierarchy with the data in the transaction data file being a top level of the hierarchy.

6. The method of claim 1 further comprising calculating an amount of time to execute the a first of the one or more steps.

7. The method of claim 6 wherein the step of determining the level of service comprises determining the level of service based on the amount of time required to execute the first step.

8. The method of claim 1, wherein the one or more steps include retrieving an information resource hosted on the server.

9. The method of claim 8 further comprising aborting the step of retrieving when a timeout threshold is exceeded.

10. The method of claim 8 wherein the parameters comprise an address and port of the information resource.

11. The method of claim 1, wherein the user performing one or more steps comprises the user performing a plurality of steps including a first step and one ore more subsequent steps.

12. The method of claim 11, further comprising, at the second computer:

identifying the one or more subsequent steps in the transaction data file;

executing the one or more subsequent steps by attempting to retrieve information resources identified by the subsequent one or more steps; and returning respective levels of service for respective servers hosting the respective information resources identified in the one or more steps.

* * * * *